(12) United States Patent
Fan et al.

(10) Patent No.: US 11,977,242 B2
(45) Date of Patent: May 7, 2024

(54) PROCESSING TECHNOLOGY FOR SINGLE-COLUMN AND MULTI-ROW EQUIVALENT NEGATIVE REFRACTIVE INDEX PLATE LENS

(71) Applicant: ANHUI DONGCHAO SCIENCE AND TECHNOLOGY COMPANY LIMITED, Anhui (CN)

(72) Inventors: Chao Fan, Anhui (CN); Dongcheng Han, Anhui (CN); Liangliang Zhang, Anhui (CN)

(73) Assignee: ANHUI DONGCHAO SCIENCE AND TECHNOLOGY COMPANY LIMITED, Anhui (CN)

( * ) Notice: Subject to any disclaimer, the term of this patent is extended or adjusted under 35 U.S.C. 154(b) by 756 days.

(21) Appl. No.: 17/030,502

(22) Filed: Sep. 24, 2020

(65) Prior Publication Data

US 2021/0018658 A1 Jan. 21, 2021

Related U.S. Application Data

(63) Continuation of application No. PCT/CN2018/095950, filed on Jul. 17, 2018.

(30) Foreign Application Priority Data

Jul. 4, 2018 (CN) .......................... 201810726637.7

(51) Int. Cl.
*G02B 3/00* (2006.01)
*G02B 6/293* (2006.01)
*H04N 13/204* (2018.01)

(52) U.S. Cl.
CPC ....... *G02B 3/0037* (2013.01); *G02B 6/29301* (2013.01); *H04N 13/204* (2018.05)

(58) Field of Classification Search
CPC ............ B29D 11/00663; G02B 3/0037; G02B 6/29301; H04N 13/204
(Continued)

(56) References Cited

U.S. PATENT DOCUMENTS

2016/0341964 A1* 11/2016 Amitai ...................... G06F 3/16
2020/0031712 A1* 1/2020 Nakano .................. G02B 30/56

FOREIGN PATENT DOCUMENTS

| CN | 1103630 A | 6/1995 |
|---|---|---|
| CN | 1600724 A | 3/2005 |

(Continued)

OTHER PUBLICATIONS

Extended European Search Report dated May 21, 2021 received in European Patent Application No. EP 18925489.9.
(Continued)

*Primary Examiner* — S. Behrooz Ghorishi
*Assistant Examiner* — Gregory C. Grosso
(74) *Attorney, Agent, or Firm* — Scully, Scott, Murphy & Presser, P.C.

(57) ABSTRACT

Provided is a processing method for a single-column and multi-row equivalent negative refractive flat lens, including: processing an optical material into parallel plates including upper and lower surfaces each being a polished surface; cutting the parallel plates into strip-shaped optical waveguides; plating each polished surface with an aluminum film; attaching and gluing the surfaces together to form a single-column and multi-row strip-shaped optical waveguide array; curing the strip-shaped optical waveguide array through heating treatment; cutting the plate of the strip-shaped optical waveguide array into two sets of plates of strip-shaped optical waveguide array arranged in a direction of 45 degrees; and gluing the two sets of plates in such a manner that arrangement directions of the two sets of plates
(Continued)

are perpendicular to each other, and then adding protective window sheets on both sides of the glued plates.

9 Claims, 5 Drawing Sheets

(58) Field of Classification Search
 USPC ........................................................ 156/256
 See application file for complete search history.

(56) References Cited

FOREIGN PATENT DOCUMENTS

| CN | 101650453 A | 2/2010 |
|---|---|---|
| CN | 102109638 A | 6/2011 |
| CN | 204029962 U | 12/2014 |
| CN | 107807417 A | 3/2018 |
| CN | 107831558 A | 3/2018 |
| CN | 108233863 A | 6/2018 |
| DE | 11 2016 002 119 T5 | 2/2018 |
| EP | 0469820 B1 | 6/1997 |
| JP | 2001-074989 A | 3/2001 |
| JP | 2004-302121 A | 10/2004 |

OTHER PUBLICATIONS

Second Office Action dated May 26, 2021 received in Chinese Patent Application No. CN 201810726637.7.
First Office Action dated Dec. 7, 2020 received in Chinese Patent Application No. CN 201810726637.7 together with an English language translation.
International Search Report dated Mar. 14, 2019 issued in PCT/CN2018/095950.
Office Action dated Oct. 23, 2023 received in European Patent Application No. EP 18925789.9.

* cited by examiner

PROCESSING TECHNOLOGY FOR SINGLE-COLUMN AND MULTI-ROW EQUIVALENT NEGATIVE REFRACTIVE INDEX PLATE LENS

CROSS-REFERENCE TO RELATED APPLICATIONS

The present application is a continuation of International Application No. PCT/CN2018/095950, filed on Jul. 17, 2018, which claims priority to Chinese Patent Application No. 201810726637.7, filed on Jul. 4, 2018, both of which are hereby incorporated by reference in their entireties.

TECHNICAL FIELD

The present disclosure relates to the field of optical manufacturing, and more particularly, to a processing method of a single-column and multi-row equivalent negative refractive flat lens, aiming to achieve imaging in the air.

BACKGROUND

As a main current imaging technology, lens imaging is mainly limited by a field of view and an aperture, has optical aberrations such as spherical aberrations, coma aberrations, astigmatism, field curvature, distortion, chromatic aberration and the like, and thus has a great limitation in the field of large-field and large-aperture imaging display. Moreover, most of the current naked eye three-dimensional display technologies achieve the three-dimensional sense by adjusting parallax between left and right eyes, and thus do not belong to the actual three-dimensional display technologies. However, the holographic imaging technology has high production costs.

In order to pursue a better display effect and a better product experience, the present disclosure provides a processing technology for an equivalent negative refractive flat lens capable of achieving three-dimensional imaging display, thereby providing technological support for an equivalent negative refractive flat lens which achieves naked eye three-dimensional display.

SUMMARY

For the problems in the related art, the present disclosure provides a processing method of a single-column and multi-row equivalent negative refractive flat lens, which can greatly reduce individual differences among the traditionally processed strip-shaped optical waveguides and achieve the purpose of sharp three-dimensional imaging of a spliced array. The technical solutions of the present disclosure will be described as follows.

A processing method of a single-column and multi-row equivalent negative refractive flat lens includes the following steps:

(1) processing an optical material into parallel plates, the parallel plates including upper and lower surfaces each being a polished surface;

(2) cutting the parallel plates into strip-shaped optical waveguides along one edge thereof, each of the strip-shaped optical waveguides having a length, a width and a thickness that satisfy 10 mm<the length<200 mm, 0.1 mm<the width<5 mm, and 0.1 mm<the thickness<5 mm;

(3) plating each of two polished surfaces of each of the strip-shaped optical waveguides with an aluminum film;

(4) attaching and gluing the surfaces plated with the aluminum film of the strip-shaped optical waveguides together to form a single-column and multi-row strip-shaped optical waveguide array;

(5) curing the strip-shaped optical waveguide array through heating treatment to form a plate of the strip-shaped optical waveguide array;

(6) processing two surfaces of the plate of the strip-shaped optical waveguide array in such a manner that the two surfaces are polished and parallel to each other, and then cutting the plate of the strip-shaped optical waveguide array into two sets of plates of strip-shaped optical waveguide array which are arranged in a direction of 45 degrees;

(7) gluing the two sets of plates of strip-shaped optical waveguide array in such a manner that arrangement directions of the two sets of plates of strip-shaped optical waveguide array are perpendicular to each other, and then adding protective window sheets on both sides of the glued plates so as to obtain the single-column and multi-row equivalent negative refractive flat lens.

The present disclosure has beneficial effects as follows. The present disclosure can greatly reduce individual differences among the traditionally processed strip-shaped optical waveguides and greatly reduce the image cropping defect. Two polished surfaces of the strip-shaped optical waveguides are plated with the aluminum films, so that the dependence of the flat lens on types of optical materials is greatly reduced and the requirements of a gluing technology on bubbles and impurities are reduced. The requirements for three-dimensional display characteristics and the naked eye three-dimensional holographic display are met, and the purpose of sharp three-dimensional imaging of the spliced array can be truly achieved.

BRIEF DESCRIPTION OF DRAWINGS

It should be noted that each five-pointed star in the above drawings represents a simple image.

DESCRIPTION OF EMBODIMENTS

In the following, the present disclosure will be described in further detail with reference to the drawings and embodiments, aiming to explain, rather than limiting, the present disclosure.

Figure 1:
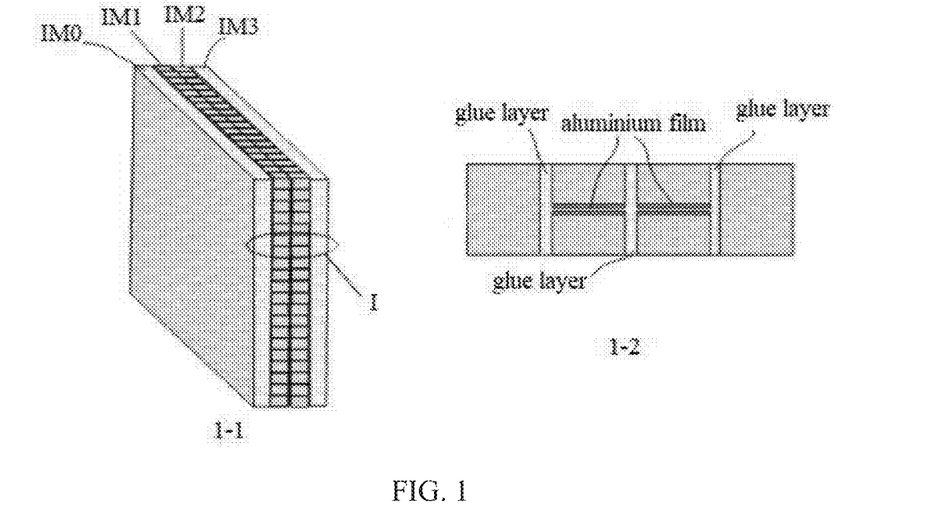
FIG. 1 is a schematic structural view of a single-column and multi-row equivalent negative refractive flat lens obtained by the present disclosure, in which 1-1 is a schematic structural view of a single-column and multi-row equivalent negative refractive flat lens, 1-2 is a partially enlarged view of region I, IM0 represents a first glass window sheet, IM1 represents a first set of plates of optical waveguide array, IM2 represents a second set of plates of optical waveguide array, and IM3 represents a second glass window sheet.
Figure 2:
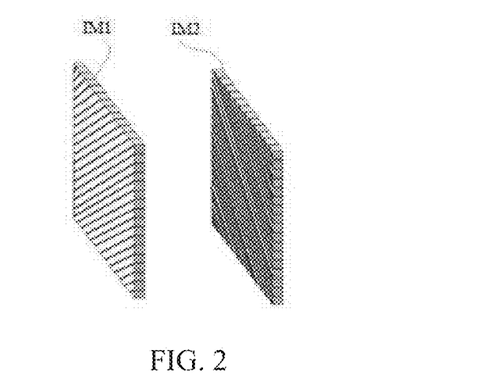
FIG. 2 is an exploded view of two sets of plates IM1 and IM2 of optical waveguide array of FIG. 1.

FIG. 1 and FIG. 2 are schematic structural diagrams of a single-column and multi-row equivalent negative refractive flat lens according to the present disclosure. The flat lens includes a pair of glass windows each having two optical films, and two sets of optical waveguide arrays located between the two glass windows. The optical waveguide array is composed of single-column and multi-row optical waveguides arranged obliquely at 45° and having a rectangular cross section, and waveguide directions of mutually corresponding parts of the two sets of optical waveguide arrays are perpendicular to each other. Such flat lens can enable a two-dimensional or three-dimensional light source to directly generate a real image in air and thus achieve a real holographic image. This can achieve naked eye three-dimensional display characteristics while achieving a large field of view, a large aperture and a high resolution with no distortion and no chromatic dispersion.

Embodiment 1

Figure 3:
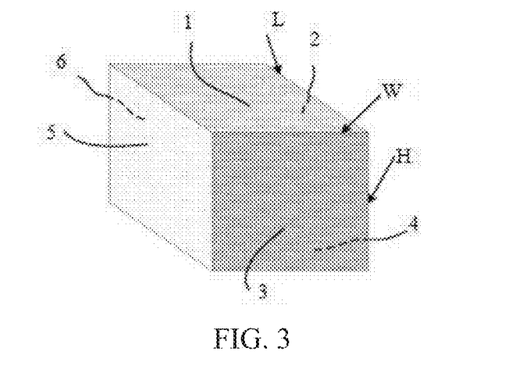
FIG. 3 is a schematic structural view of a raw material in Embodiment 1 of the present disclosure, in which 1/2/3/4/5/6 represent six surfaces, L represents a length, W represents a width, and H represents a height.

The present embodiment provides a processing method of a single-column and multi-row equivalent negative refractive flat lens, which includes steps as follows:

1) Firstly, a raw material as shown in FIG. 3 is provided, and six surfaces thereof are ground and polished. A contrast goniometer is used to detect and assist the processing, in such a manner that mutually perpendicular surfaces of the material have a perpendicularity deviation smaller than 1' (so that light beams from an object side are reflected and modulated by the optical waveguide surface and then converge at a deviation satisfying the imaging requirement), and the size satisfies that 10 mm<length (L)<200 mm, 10 mm<width (W)<200 mm, and 10 mm<height (H)<200 mm.

Figure 4:
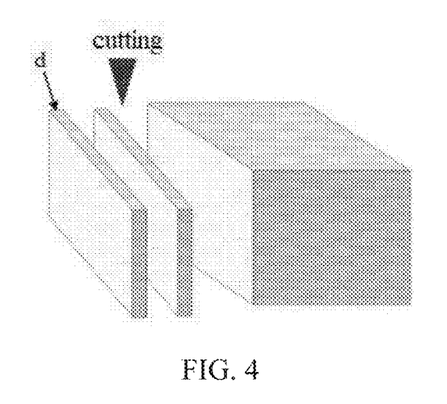
FIG. 4 is a schematic view showing cutting of parallel plates in Embodiment 1 of the present disclosure, and d represents a thickness of one parallel plate.

2) Each surface of the square polished material obtained by the processing in 1) is coated with a protective layer. The protective layer has a main function of protecting each polished surface from being scratched in the subsequent processing processes. The square polished material coated with the protective layer is sliced, and as shown in FIG. 4, the sliced sheet material has a thickness of 3 mm<d<4 mm Such control of the thickness can reduce unnecessary material waste on one hand and provide allowance for subsequent grinding on the other hand.

3) The protective layer is removed from the sheet material obtained by the cutting in 2), and then double-sided grinding and polishing are performed on the sheet material in such a manner that a parallelism deviation of upper and lower surfaces of the sheet material is smaller than 1' (so that light beams from an object side are reflected and modulated by the optical waveguide surface and then converge at a deviation satisfying the imaging requirement), and a parallel plate after being polished has a thickness d smaller than 1.5 mm. The thickness of the finally processed parallel plate is related to the imaging quality, and the smaller thickness leads to the smaller size of a single pixel of focusing imaging and the higher imaging sharpness.

Figure 5:
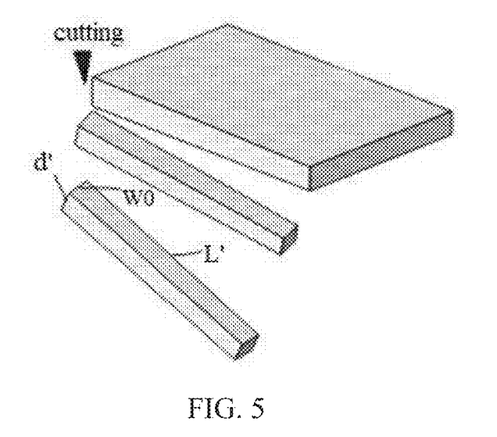
FIG. 5 is a schematic view showing cutting of strip-shaped optical waveguides in Embodiment 1 of the present disclosure, in which L' represents a length, W0 represents a width, and d' represents a thickness.

4) The parallel plate obtained by the processing in 3) is cut. As shown in FIG. 5, the parallel plate is cut into strip-shaped optical waveguides each having a length of 10 mm<L'<200 mm, a thickness of d'<1.5 mm and a width of 3 mm<W0<4 mm Such control of the width can reduce unnecessary material waste on one hand and provide allowance for subsequent grinding on the other hand.

Figure 6:
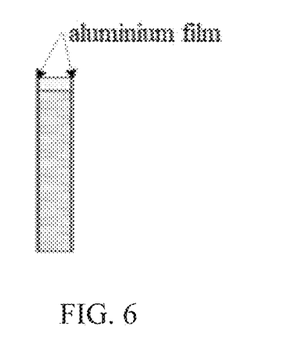
FIG. 6 is a schematic structural view of a strip-shaped optical waveguide plated with films in Embodiment 1 of the present disclosure.

5) The polished surfaces on two sides of the strip-shaped optical waveguide obtained by the cutting in 4) are plated with aluminum films, in order to prevent impurities and bubbles on glued surfaces formed by subsequent gluing of respective surfaces and mismatching between the refractivees of the glue and the material from destroying the total reflection characteristics on both sides of the glued surfaces, which would otherwise affect the imaging, as shown in FIG. 6.

Figure 7:
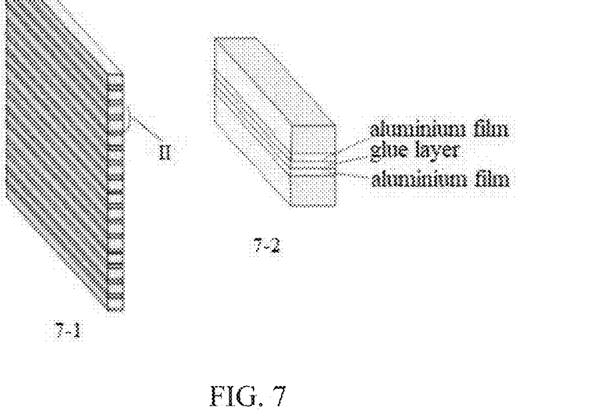
FIG. 7 is a schematic structural view of a plate of strip-shaped optical waveguide array in Embodiment 1 of the present disclosure, in which 7-1 is a schematic structural view of the plate of strip-shaped optical waveguide array, and 7-2 is a partially enlarged view of region II.

6) The strip-shaped optical waveguides plated with films in 5) are glued and spliced. The glue may be a thermosetting glue. The plated surfaces on two sides of the strip-shaped waveguides are attached and spliced to form a plate of the strip-shaped optical waveguide array as shown in FIG. 7. During the gluing and splicing, the parallelism deviation of the two sides of the plate array is required to be detected to be smaller than 1' (so that light beams from an object side are reflected and modulated by the optical waveguide surface and then converge at a deviation satisfying the imaging requirement), and then glue is cured to form a plate of a strip-shaped optical waveguide array.

7) The upper and lower surfaces of the plate of the strip-shaped optical waveguide array of 6) are ground and polished. The parallelism deviation of the upper surface and the lower surface after being polished is smaller than 1' and the perpendicularity deviation of the upper and the lower surfaces with respect to the side surfaces is smaller than 1' (so that light beams from an object side are reflected and modulated by the optical waveguide surface and then converge at a deviation satisfying the imaging requirement).

8) The plate of the strip-shaped optical waveguide array obtained by the processing in 7) is coated with a protective layer and then cut into two sets of plates of optical waveguide array illustrated as IM1 and IM2 in FIG. 2.

9) The two sets of plates of optical waveguide array in 8) are glued in such a manner that arrangement directions thereof are perpendicular to each other. The glue can be a transparent colloid material such as photosensitive glue, thermosensitive glue and so on.

10) In order to protect the two sets of plates of optical waveguide array manufactured in 9), protective window sheets IM0 and IM3 shown in FIG. 1 are required to be added on both sides thereof, and transparent colloid materials such as photosensitive glue or thermosensitive glue can be used as the colloid material between the protective glass and the plates of optical waveguide array. In this way, the single-column and multi-row equivalent negative refractive flat lens shown in FIG. 1 can be achieved.

Embodiment 2

The imaging principle of the single-column and multi-row equivalent negative refractive flat lens obtained in Embodiment 1 will be explained as follows.

Figure 8:
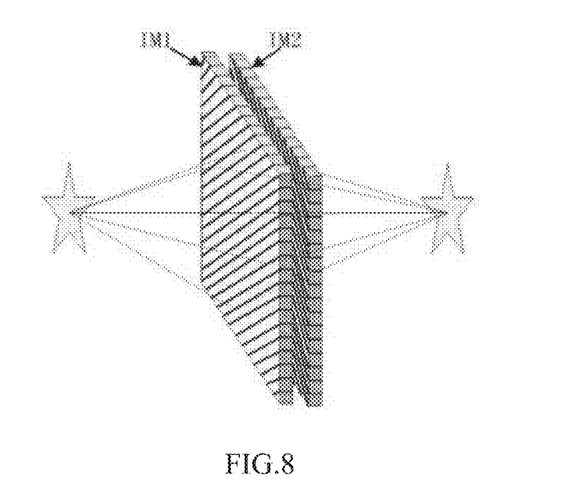
FIG. 8 illustrates imaging of two sets of plates IM1 and IM2 of optical waveguide array in Embodiment 2 of the present disclosure.
Figure 9:
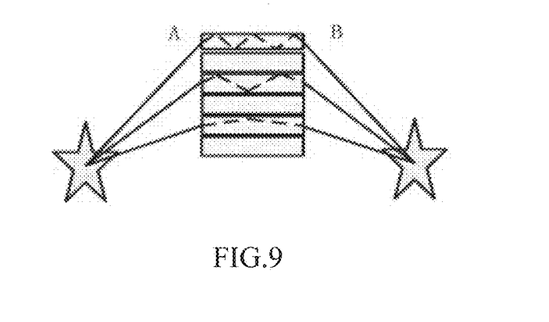
FIG. 9 is a schematic diagram illustrating reflection and focusing imaging of light rays inside an optical waveguide, in which A/B represents orientations on both sides.
Figure 10:
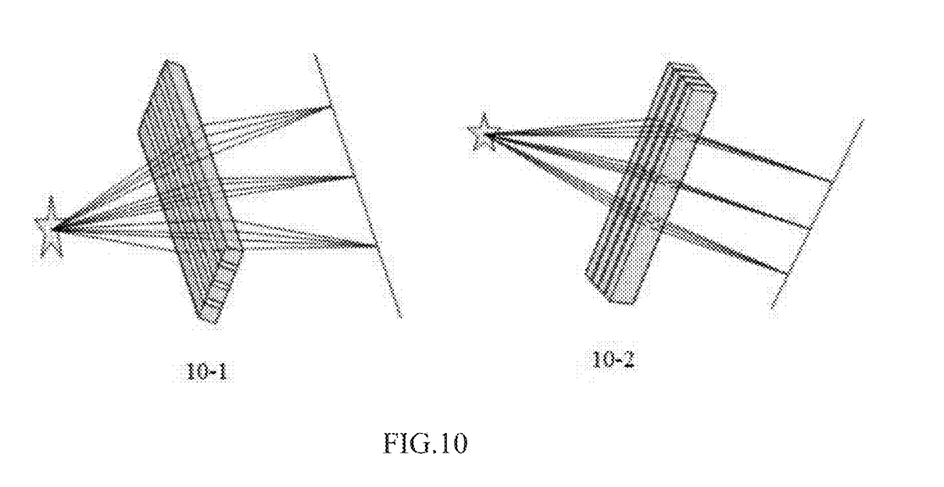
FIG. 10 is an exploded view illustrating imaging of two sets of plates of optical waveguide array in FIG. 8, in which 10-1 is a schematic diagram illustrating convergence of unidirectional imaging light rays of the plate IM1 of optical waveguide array, and 10-2 is a schematic diagram illustrating convergence of unidirectional imaging light rays of the plate IM2 of optical waveguide array.
Figure 11:
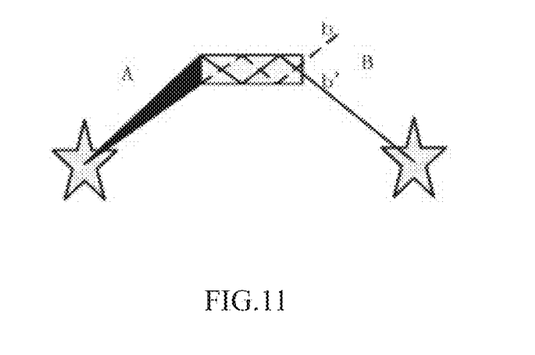
FIG. 11 is a schematic diagram illustrating a principle of generating stray light and imaging light by the optical waveguide, in which A/B represent orientations on both sides, B represents a stray light beam, and b' represents an imaging light beam.
Figure 12:
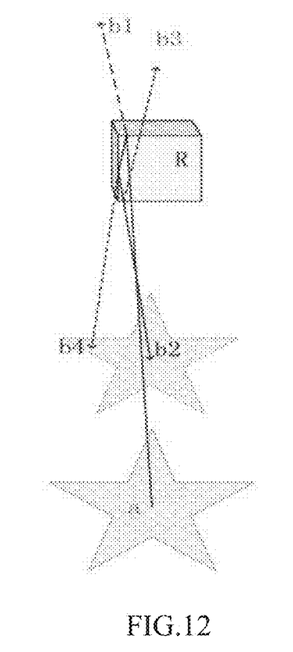
FIG. 12 is a schematic diagram illustrating a principle of the affection of stray light when each unit of the optical waveguide array is equivalent to a cube R and images an object, where b1, b3, and b4 are stray light beams, b2 is an imaging beam, and a represents an object beam.
Figure 13:
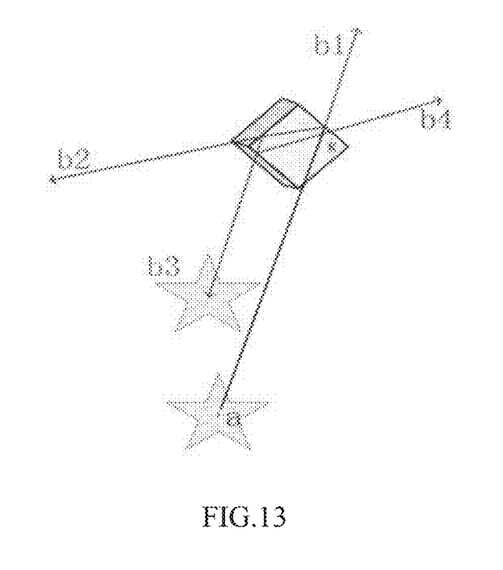
FIG. 13 is a schematic diagram illustrating a principle of avoiding affection of stray light after a cube R in FIG. 12 is rotated by 45°, in which b1, b3, and b4 each represents stray light beams, b2 represents an imaging beam, and a represents an object beam.

The present disclosure relates to two single-column and multi-row equivalent negative refractive optical waveguide array plates IM1 and IM2 that are orthogonal to each other, as core imaging elements. As shown in FIG. 8, the present disclosure can achieve point-to-point aberrationless imaging between an object side and an image side. As shown in FIG. 9, the specific principle lies in that a light beam from an object side at side A is reflected inside optical waveguides of the equivalent negative refractive flat lens one or more times, so that the light beam is modulated into mirror image light while being transmitted to an image side at side B, and then the light beam converges to an image again. When the IM1 and the IM2 are disassembled, as shown in FIG. 10, light beams from a single point at an object side, after entering the equivalent negative refractive flat lens from a single side, are subjected to mirror image modulation by respective rows of optical waveguides, and then converge on a straight line parallel to a long side of the optical waveguides again, so as to form a point-to-line one-dimensional imaging effect. In order to achieve that light from both directions intersects at one point, i.e., achieving the point-to-point imaging effect of an equivalent negative refractive flat lens, two sets of optical waveguides are used jointly. To be specific, arrangement directions of the two sets of optical waveguides are perpendicular to each other. Then, the point-to-point modulation can be performed on an object image as a target, and the imaging effect is consistent with that of the flat lens made of a negative refractive material (with reference to FIG. 8). Since the optical waveguide according to the present disclosure can only partially modulate the object light, as shown in FIG. 11, mirror image modulated light b' participates in imaging, and light b will keep characteristics of the original object light to form stray light. Each unit formed by a combination of two sets of optical waveguides that are perpendicular to each other is equivalent to one square waveguide for stray light analysis. As shown in FIG. 12, the combined waveguide generates four light beams at the image side, at least two of which reach an image plane, including one participating in imaging and another one affecting imaging as stray light. In order to avoid the stray light shown in FIG. 12, two sets of optical waveguide arrays need to be rotated by 45° and orthogonally arranged with respect to each other, so as to eliminate the affection of the stray light, as shown in FIG. 13. The final imaging effect of the imaging principle is consistent with that of a flat lens made of a negative refractive material.

In conclusion, the embodiments of the present disclosure mainly describe the processing method of the single-column and multi-row equivalent negative refractive flat lens and the imaging principle of the flat lens. With the equivalent negative refractive flat lens manufactured according to the processing method of the present disclosure, there are smaller differences among the individual optical waveguides, so that the image cropping defect caused by the differences among the individual optical waveguides can be greatly reduced. Meanwhile, the materials used by the flat lens of the present disclosure can be conventional optical materials, and the processing method can achieve high-precision processing in a shorter time. The double-sided plating of the strip-shaped optical waveguide can avoid defects such as bubbles, impurities and the like generated in the gluing process, which would otherwise affect the imaging, thereby greatly reducing the difficulty of the gluing process. The high-definition imaging can be achieved, and it is easy to achieve mass production is easy with lower cost.

Although embodiments of the present disclosure have been illustrated and described above, it will be understood that the above embodiments are exemplary and cannot be construed as limiting the present disclosure, and changes, modifications, substitutions and alternatives to the above embodiments may be made by those of ordinary skill in the art within the scope of the present disclosure.

What is claimed is:

1. A processing method of a single-column and multi-row equivalent negative refractive flat lens, comprising: processing an optical material into parallel plates, the parallel plates comprising upper and lower surfaces each being a polished surface; cutting the parallel plates into strip-shaped optical waveguides along one edge thereof, each of the strip-shaped optical waveguides having a length greater than 10 mm and smaller than 200 mm, a width greater than 0.1 mm and smaller than 5 mm, and a thickness greater than 0.1 mm and smaller than 5 mm; plating each of two polished surfaces of each of the strip-shaped optical waveguides with an aluminum film; attaching and gluing the surfaces plated with the aluminum film of the strip-shaped optical waveguides together to form a single-column and multi-row strip-shaped optical waveguide array; taking out the optical waveguide array, and curing the strip-shaped optical waveguide array through heating treatment to form a plate of the strip-shaped optical waveguide array; processing two surfaces of the plate of the strip-shaped optical waveguide array in such a manner that the two surfaces are polished and parallel to each other, and then cutting the plate of the strip-shaped optical waveguide array into two sets of plates of strip-shaped optical waveguide array which are arranged in a direction of 45 degrees relative to edges of the strip-shaped optical waveguide array; and gluing the two sets of plates of strip-shaped optical waveguide array in such a manner that arrangement directions of the two sets of plates of strip-shaped optical waveguide array are perpendicular to each other, and then adding protective window sheets on both sides of the glued plates to obtain the single-column and multi-row equivalent negative refractive flat lens.

2. The processing method according to claim 1, wherein each of the strip-shaped optical waveguides has a rectangular cross section.

3. The processing method according to claim 1, wherein the width is greater than 3 mm and smaller than 4 mm, and the thickness is smaller than 1.5 mm.

4. The processing method according to claim 1, wherein the two sets of plates of strip-shaped optical waveguide array are glued by using a first transparent colloid material.

5. The processing method according to claim 4, wherein the first transparent colloid material is photosensitive glue.

6. The processing method according to claim 4, wherein the first transparent colloid material is thermosensitive glue.

7. The processing method according to claim 1, wherein the protective window sheets are added on both sides of the glued plates by using a second transparent colloid material.

8. The processing method according to claim 7, wherein the second transparent colloid material is photosensitive glue.

9. The processing method according to claim 7, wherein the second transparent colloid material is thermosensitive glue.

\* \* \* \* \*